US006232976B1

(12) United States Patent
Dalal et al.

(10) Patent No.: US 6,232,976 B1
(45) Date of Patent: May 15, 2001

(54) OPTIMIZING DYNAMIC/ANIMATING TEXTURES FOR USE IN THREE-DIMENSIONAL MODELS

(75) Inventors: Ketan K. Dalal; Ian B. Pieragostini, both of Seattle; Stephen J. Lacey, Kirkland, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/173,839

(22) Filed: Oct. 16, 1998

(51) Int. Cl.[7] .................................................. G06T 17/00
(52) U.S. Cl. ........................................... 345/419; 345/420
(58) Field of Search .................................. 345/419, 420, 345/349, 355, 430, 440

(56) References Cited

U.S. PATENT DOCUMENTS 5,678,015 * 10/1997 Goh ........................................ 345/419
5,831,617 * 11/1998 Bhukhanwala ........................ 345/439
5,835,094 * 11/1998 Ermel et al. ........................... 345/349
6,043,818 * 3/2000 Nakano et al. ....................... 345/349

* cited by examiner

Primary Examiner—Cliff N. Vo
(74) Attorney, Agent, or Firm—Christensen O'Connor Johnson Kindness PLLC

(57) ABSTRACT

A method, system and computer-readable medium for generating images of three-dimensional models in a digital three-dimensional world, wherein the three-dimensional models include markup documents preassigned as texture. First, the three-dimensional models located in the digital three-dimensional world to be displayed are determined. Next, the markup documents that are preassigned to the texture of the three-dimensional models that are determined to be displayed are identified. Then, the identified markup documents and the three-dimensional models that were determined to be displayed are rendered. The rendered markup documents are mapped as texture to the corresponding rendered three-dimensional models and displayed on a display device.

12 Claims, 5 Drawing Sheets

OPTIMIZING DYNAMIC/ANIMATING TEXTURES FOR USE IN THREE-DIMENSIONAL MODELS

FIELD OF THE INVENTION

This invention relates to computer-generated composite documents and, more particularly, to computer-generated dynamic composite documents within three-dimensional models.

BACKGROUND OF THE INVENTION

At present, three-dimensional image rendering is a relatively expensive and time-consuming process. Typically, a three-dimensional image is an image of three-dimensional models in a computer-defined three-dimensional world viewed from a viewpoint within the three-dimensional world. Many times, the three-dimensional world includes a number of three-dimensional models that are spread throughout to create a virtual environment. Generally, an image of the three-dimensional models in the three-dimensional world can only view a portion of the three-dimensional models in the three-dimensional world. Assume a three-dimensional world includes dozens of three-dimensional models and an image to be generated is a perspective view that includes only four of the dozens of three-dimensional models. If a three-dimensional engine is required to render all of the dozens of three-dimensional models prior to generating an image that includes only four of the three-dimensional models, image rendering costs and processing time are unacceptably high. The answer to this rendering problem is to determine what three-dimensional models are to appear in the field of view of the to-be-generated image (based on a desired viewpoint) and render only those models that were determined to be within the field of view. Models that will not appear in the displayed output are not rendered, thereby minimizing rendering costs and processing time.

Markup documents generated by a markup document processing component, such as an HTML image renderer of an operating system utility, as described in co-pending patent application Ser. No. 09/105,831, are rendered and stored in texture image files that are then mapped to three-dimensional models by a three-dimensional engine. Even though the three-dimensional engine understands how to save processing time and costs by only rendering those three-dimensional models that appear within the field of view, the markup document processing component still renders all markup documents that are assigned to textures on all of the three-dimensional models within the three-dimensional world.

The present invention is directed to overcoming the foregoing and other disadvantages. More specifically, the present invention is directed to providing a method and apparatus for making a markup document processing component more efficient when rendering markup documents as texture on three-dimensional models.

SUMMARY OF THE INVENTION

In accordance with this invention, a method, system and computer readable medium for generating images of three-dimensional models in a digital three-dimensional world, wherein the three-dimensional models include markup documents preassigned as texture, is provided. Information is received based on an input event. The information includes viewpoint information within a three-dimensional world that comprises a plurality of three-dimensional models. The three-dimensional models that are to be displayed are determined based on the received viewpoint information and the markup documents preassigned as texture to the three-dimensional models that are determined to be displayed are identified. Then, the identified markup documents are rendered and stored in texture image files based on the received information. The three-dimensional models that are determined to be displayed are rendered and the markup documents stored in the texture image files are mapped to the rendered three-dimensional models.

In accordance with other aspects of the present invention, the input event is a selection of an address that identifies the location of the information.

In accordance with still other aspects of the present invention, the received viewpoint information comprises information regarding a change in the viewpoint of a presently displayed image of the three-dimensional world. With regard to this aspect of the present invention the input event is an automatic or manual selection of a new viewpoint within the digital three-dimensional world.

As will be readily appreciated from the foregoing summary, the invention provides a method, system and computer readable medium for efficiently rendering markup documents that are assigned as textures to three-dimensional models positioned in a digital three-dimensional world.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

In accordance with the present invention, markup documents assigned as texture on three-dimensional models are efficiently rendered. A markup language instructs a printer or video display how to present a markup document using content and format information and how to index or link the contents of the markup document using linking information. In other words, the markup language may contain instructions that allow the displayed representation to be interactive, dynamic and/or self-modifying. The displayed markup documents may include user-interface elements, such as buttons, events, listboxes, dropdowns, scrollbars, layout, text, three-dimensional party controls (like plugins, ActiveX controls, Shockwave), images, animation, timer services, alignment, flow-control, scripting languages, and the like. The user-interface element may be a link element that is in the form of graphical images and/or text that are hyperlinked to another document, file or script. Thus, like user-interface elements included in two-dimensional markup documents, the user-interface elements included in the displayed three-dimensional model allow users to interact with the texture of the three-dimensional model. With link elements, jumps to another document, file or script, or to another document, file or script to be included on the texture of a displayed three-dimensional model are possible. As will be readily appreciated by those of ordinary skill in graphics, a texture image file constitutes a unit of information representing a rendered HTML document that is either located in memory or in a storage location on a disk.

Markup documents may also include embedded sound sources. When a three-dimensional model includes a markup document with an embedded sound source, a multimedia processor, such as DirectX, combines the sound generated by the sound source with the three-dimensional model. The sound is played back through a speaker system to convey where the corresponding markup document is located on the three-dimensional model.

When multiple three-dimensional models are located in a digital three-dimensional world, only the three-dimensional models that will be displayed are rendered. Also, in accordance with the present invention only the markup documents assigned to the texture image files of the to-be-displayed three-dimensional models are rendered. As a result, three-dimensional models and corresponding markup documents that will not be displayed are not unnecessarily rendered. The process of performing this selective rendering is shown in the flow diagram of FIG. 3, by example in FIGS. 4 and 5, and described in more detail below.

Figure 1:
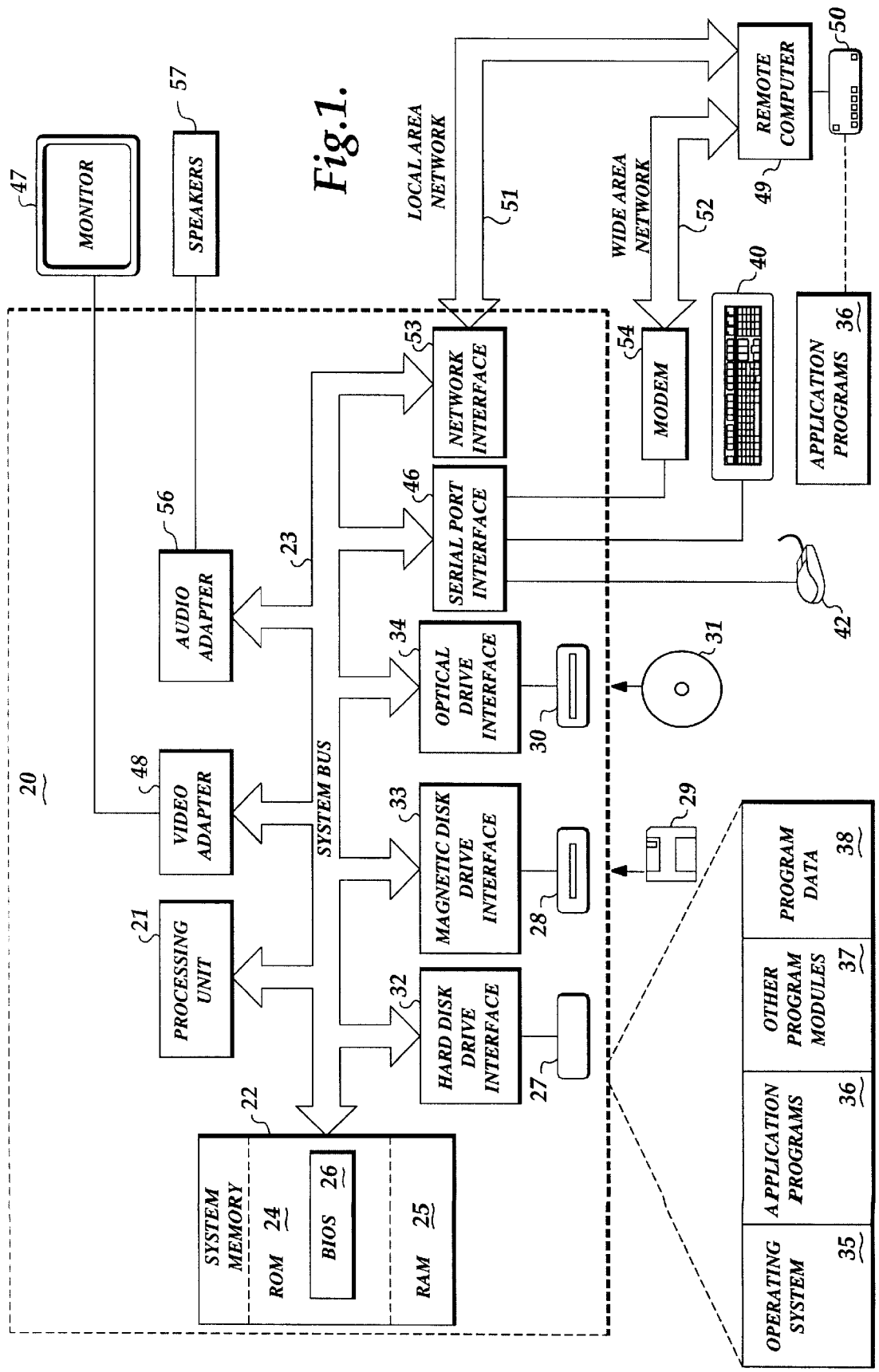
FIGS. 1 and 2 are block diagrams of general purpose computer systems for implementing the present invention.

FIG. 1 and the following discussion are intended to provide a brief, general description of a suitable computing world in which the present invention may be implemented. Although not required, the invention will be described in the general context of computer-executable instructions, such as program modules, being executed by a personal computer. Generally, program modules include routines, programs, characters, components, data structures, etc., that perform particular tasks or implement particular abstract data types. As those skilled in the art will appreciate, the invention may be practiced with other computer system configurations, including hand-held devices, multiprocessor systems, microprocessor-based or programmable consumer electronics, network PCs, minicomputers, mainframe computers, and the like. The invention may also be practiced in distributed computing worlds where tasks are performed by remote processing devices that are linked through a communications network. In a distributed computing world, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to a removable magnetic disk 29, and an optical disk drive 30 for reading from or writing to a removable optical disk 31, such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary world described herein employs a hard disk, a removable magnetic disk 29, and a removable optical disk 31, it should be appreciated by those skilled in the art that other types of computer-readable media that can store data that is accessible by a computer, such as magnetic cassettes, flash memory cards, digital video disks, Bernoulli cartridges, random access memories (RAMs), read only memories (ROMs), and the like, may also be used in the exemplary operating world.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may also be connected by other interfaces, such as a parallel port, game port or a universal serial bus (USB). A display 47 is also connected to the system bus 23 via an interface, such as a video adapter 48. One or more speakers 57 may also be connected to the system bus 23 via an interface, such as an audio adapter 56. In addition to the display and speakers, personal computers typically include other peripheral output devices (not shown), such as printers.

The personal computer 20 may operate in a networked world using logical connections to one or more personal computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking worlds are commonplace in offices, enterprise-wide computer networks, intranets and the Internet.

When used in a LAN networking world, the personal computer 20 is connected to the local network 51 through a network interface or adapter 53. When used in a WAN networking world, the personal computer 20 typically includes a modem 54 or other means for establishing communications over the wide area network 52, such as the Internet. The modem 54, which may be internal or external, is connected to the system bus 23 via the serial port interface 46. In a networked world, program modules depicted relative to the personal computer 20 or portions thereof may be stored in the remote memory storage device. It will be appreciated that the network connections shown are exemplary, and other means of establishing a communications link between the computers may be used.

The present invention, implemented on a system of the type illustrated in FIG. 1 and described above, efficiently renders three-dimensional models and the markup documents assigned as textures on the three-dimensional models.

Figure 2:
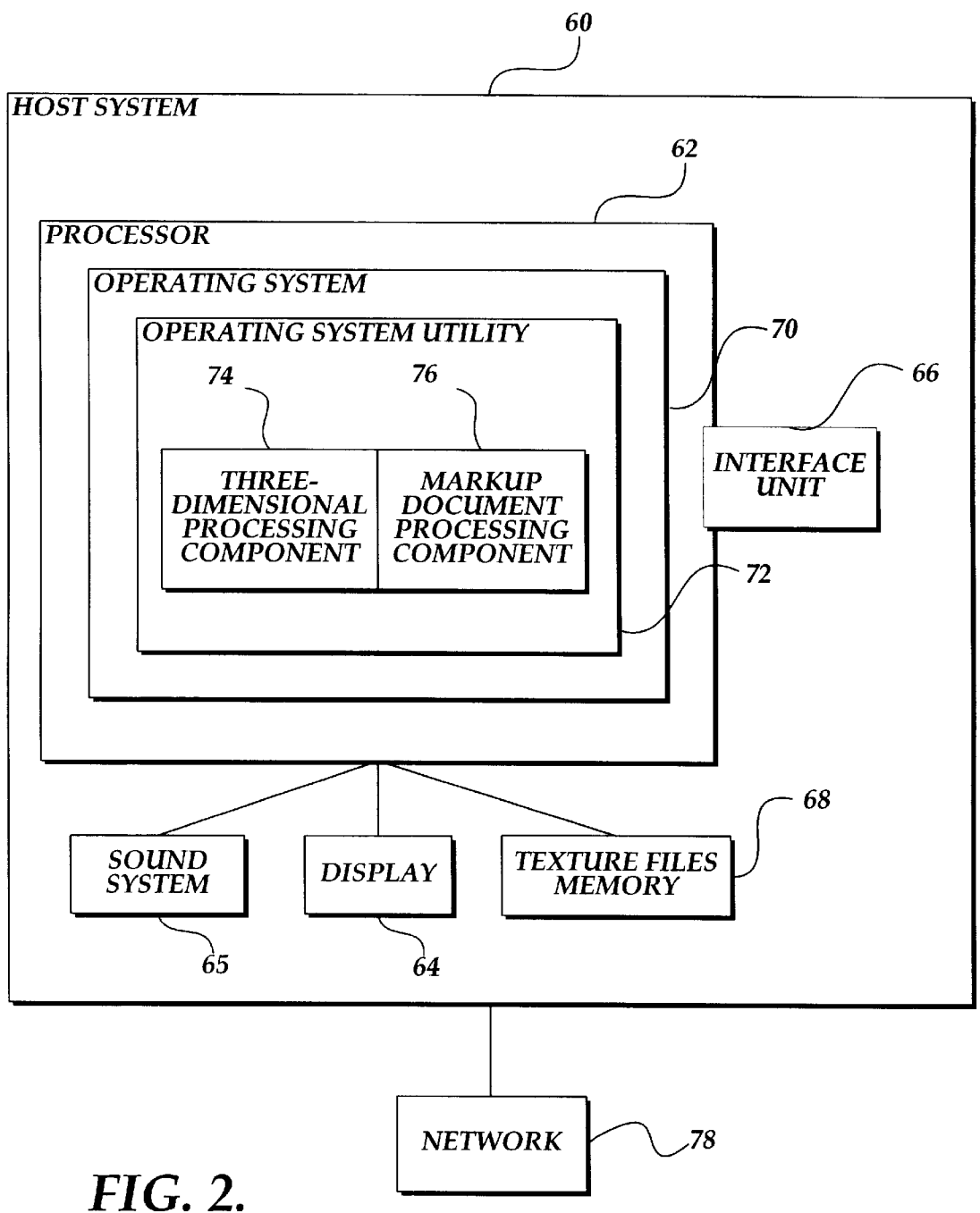

FIG. 2 illustrates the structural components, hardware and software components, included within a user's host system 60 that are required for performing the process of the present invention. The host system 60 includes a processor 62, a display 64, a sound system 65, an interface unit 66, and internal or external memory 68 for holding texture image files. The processor 62 is controlled by an operating system 70 that includes an operating system utility 72, such as a web browser. The operating system utility 72 includes a three-dimensional processing component 74 and a markup document processing component 76. The host system 60 is coupled to a network 78 for receiving information for display. Received information includes content, format and linking information that defines what information (content) is to be presented on the display 64 and through the sound system 65, how (format) the information is to be presented on the display 64 and through the sound system 65 and how user interactions will be processed (linking). As will be readily appreciated by those skilled in computer processing, the processing components described above may be distributed over a network.

In one embodiment of the present invention, the three-dimensional model processing component is implemented in software, such as DirectX. The markup processing component is also implemented in software, such as a Hypertext Markup Language (HTML) rendered. As will be readily appreciated by those of ordinary skill in the art of markup documents, the markup documents may be rendered by the markup document processing component 76 from content information stored within the system memory 22, the hard disk drive 27, the magnetic disk drive 28, the optical disk drive 30, or on remote devices located on one of the networks 51 and 52 (FIG. 1).

The information received by the host system 60 from the network 78 is requested by the host system's user or automatically sent by a remote server coupled to the host system 60 via the network 78. The received information is analyzed by the operating system utility 72 and its components. The three-dimensional processing component 74 determines the three-dimensional models that will be displayed. Based on this determination, the markup document processing component 76 renders only the markup documents assigned to the to-be-displayed three-dimensional models, then stores the rendered markup documents in the to-be-displayed three-dimensional models' texture image files that are located in the memory 68. Then, the three-dimensional processing component 74 renders the to-be-displayed three-dimensional model(s) and maps the stored markup documents. The format information provides the instructions for the storing of the markup documents in texture image files, the presenting of sound and the rendering of the three-dimensional model(s).

Figure 3:
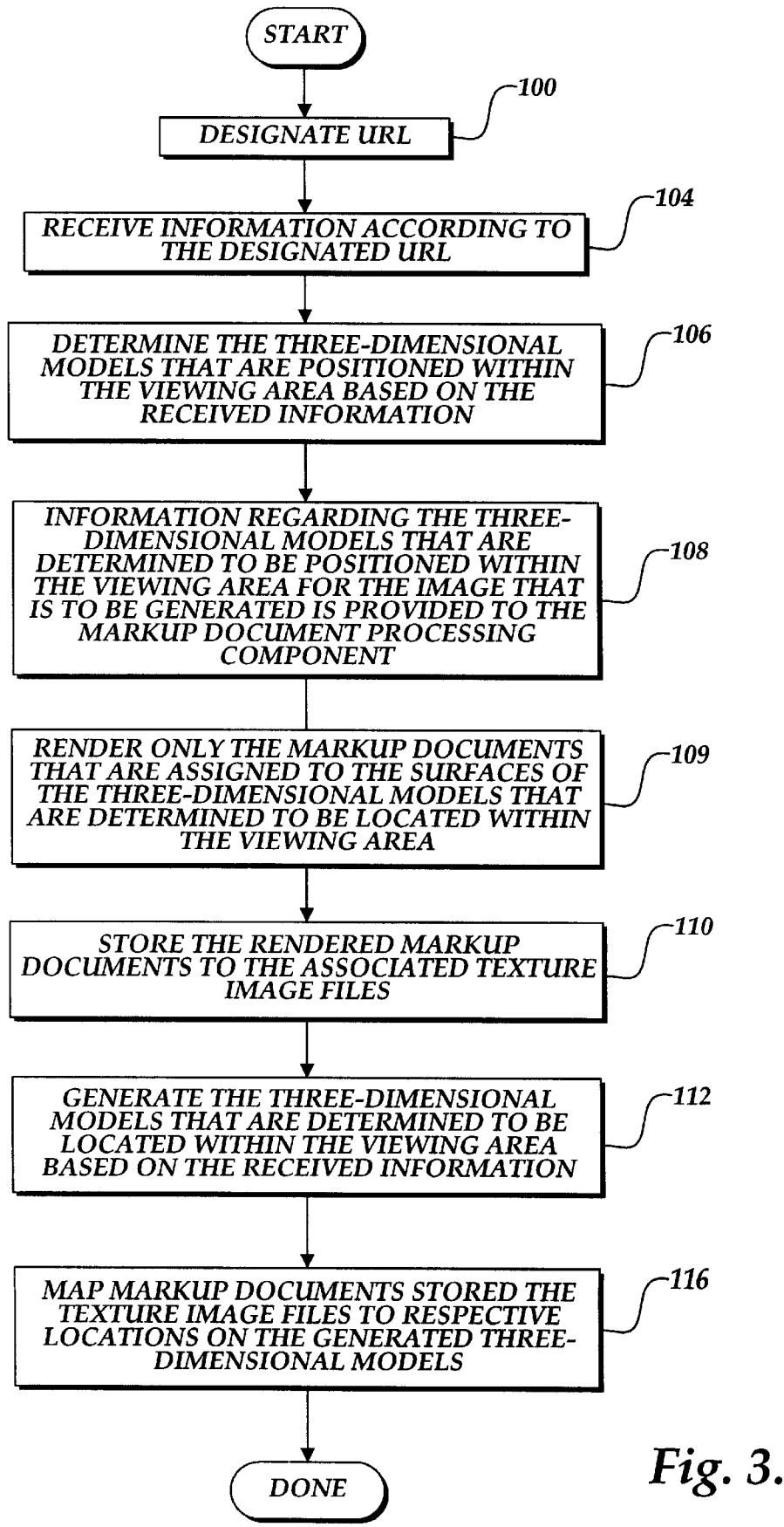
FIG. 3 is a flow diagram illustrating the process of the invention for avoiding unnecessary rendering of markup documents as texture for three-dimensional models.

FIG. 3 is a flow diagram that illustrates the process for efficiently rendering markup documents to three-dimensional models located in a digital three-dimensional world. First, at block 100, an address or URL is designated. A URL may be designated by entering the URL into a text line. Also, the URL may be accessed from a link element, included in another markup document, that was previously selected by a user, or automatically by a predefined process executing on a server. Next, at block 104, the information associated with the designated URL is received. As described above, the received information includes content, format and linking information. At block 106, the three-dimensional processing component 74 determines the three-dimensional models that are positioned within the viewing area for the image that is to be generated based on the received information. This step is referred to as "culling." Culling refers to the process whereby a determination is made whether a model should be rendered or not. One example technique is to take a bounding box (or sphere) around a three-dimensional model and determine if the bounding box intersects a visible volume of space (viewing area) defined by the viewpoint within the three-dimensional world for the to-be-generated image. As will be readily appreciated by those skilled in three-dimensional computer graphics, other techniques for determining the viewable three-dimensional models may be used. Next, at block 108, the three-dimensional processing component 74 provides the markup document processing component 76 with information regarding the three-dimensional models that are determined to be positioned within the viewing area for the image that is to be generated. In this step, the three-dimensional processing component 74 sends a texture status callback to the markup document processing component 76. The texture status callback identifies only the textures on the three-dimensional models that were determined to be displayed. At block 109, the markup document processing component 76 renders only the markup documents that are assigned to the three-dimensional models based on the information provided by the three-dimensional processing component 74. The rendered markup documents are stored in texture image files based on the received information that defines a markup document's location on a three-dimensional model. See block 110. Then, at block 112, the three-dimensional models determined to be positioned within the viewing area are generated by the three-dimensional processing component 74. The markup documents stored in the texture image files are then mapped by the three-dimensional processing component to the respective locations on the generated three-dimensional model(s). See block 116. The result of the steps performed above is that markup documents are not generated for textures of three-dimensional models that are positioned outside the viewing area.

The steps performed in blocks 106–116 are also performed when a viewpoint change is requested of a displayed image of three-dimensional models in a three-dimensional environment. The viewpoint change may be requested manually by a user manipulating a user interface or automatically by an executing process.

Figure 4:
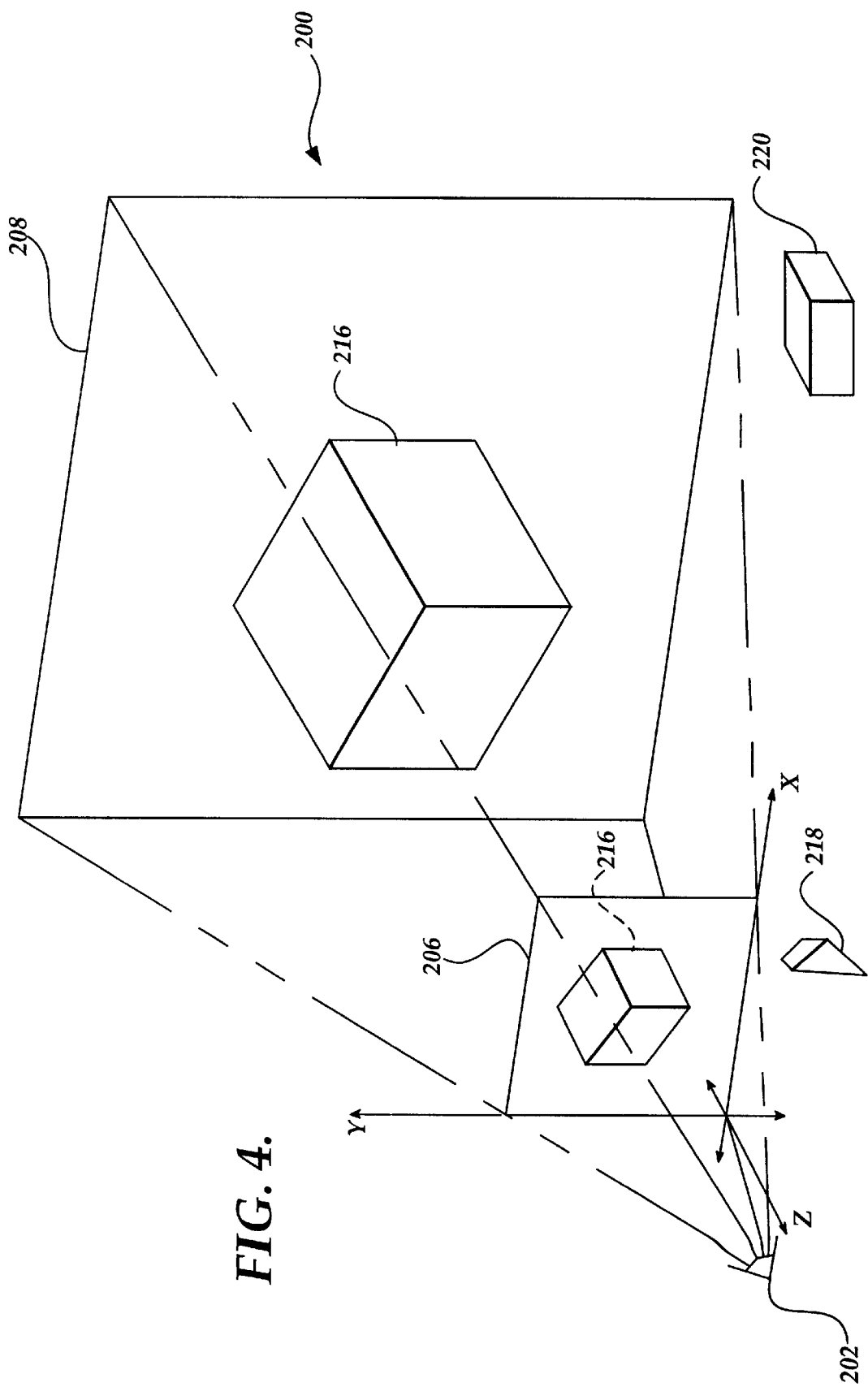
FIG. 4 is a perspective view of a camera view of three-dimensional models in a digital three-dimensional world.

FIG. 4 is an illustrative example of a digital three-dimensional world 200 from a viewpoint 202 that is positioned within the digital three-dimensional world 200. The image to be displayed based on the viewpoint 202 includes all the three-dimensional models that are located in a viewing area (field of view) 204. The viewing area 204 is the area within the three-dimensional digital world 200 that is located on the opposing side of a display plane 206 from the viewpoint 202. The display plane 206 is at some predefined focal length from the viewpoint 202. The viewing area 204 is bounded by planes formed by the rays emanating from the viewpoint 202 through the edges of the display plane 206. Another plane that is usually defined at a default value for providing the final surface that defines the viewing area 204 is a back plane 208 that is parallel to the display plane 206.

The example digital three-dimensional world 202 includes a first three-dimensional box 216 that is located within the viewing area 204, and a three-dimensional triangular shape 218 and a second three-dimensional box 220 that are located outside of the viewing area 204. The three-dimensional models 216, 218, and 220 all include markup documents that are mapped as textures. If the present invention is not employed, the markup document processing component 76 renders not only the six markup documents that are mapped to six sides of the first three-dimensional box 216, but also renders the eleven markup documents that are mapped to the five surfaces on the three-dimensional triangular shape 218 and the six surfaces on the second three-dimensional box 220. The latter rendering is unnecessary since neither the triangular shape 218 nor the second box 220 are within the viewing area 204. In accordance with the present invention, only the markup documents that correspond to the surfaces of the first three-dimensional box 216 are generated. Therefore, the markup document processing component renders six markup documents instead of seventeen markup documents. This results in a significant savings in both rendering costs and processing time, particularly when the texture is a multimedia format like MPEG, RealVideo, or HTML. Since animated sequence of images must be generated at a high rate, approximately 30 frames per second, the processing time and cost savings become quite significant when unnecessary image rendering does not occur.

Figure 5:
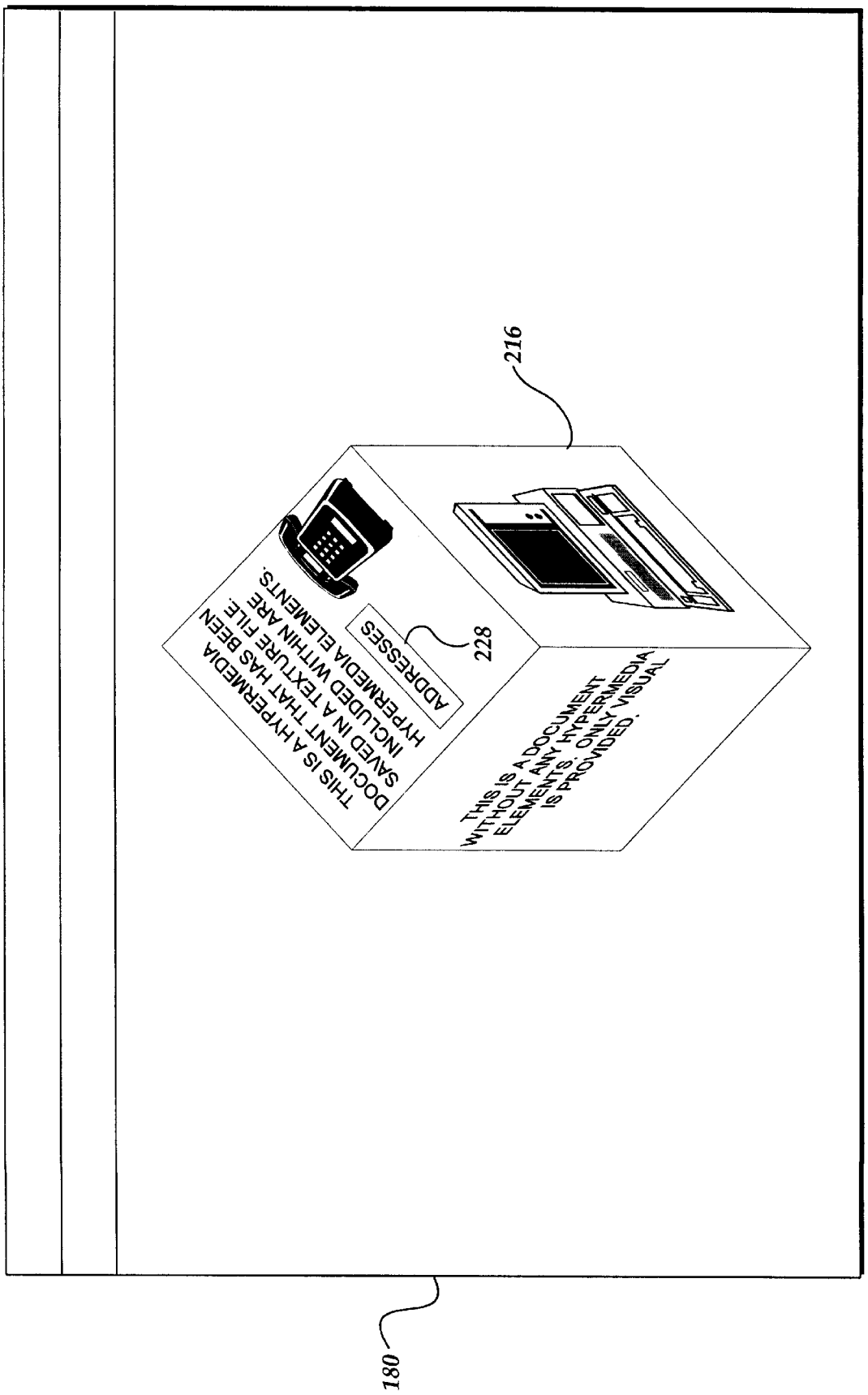
FIG. 5 is the screen display generated by the camera view shown in FIG. 4.

FIG. 5 is a screen shot of a window 180 generated based on the camera viewpoint 200 shown in FIG. 4.

Because the present invention increases processing performance by reducing operations to rendering only those models and markup documents that are to be displayed, the image generations for any model motions or camera viewpoint motions within the digital three-dimensional world can be performed in real-time.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for generating images of three-dimensional models in a digital three-dimensional world, the three-dimensional models include markup documents mapped as texture, said method comprising:

receiving information based on an input event, wherein the information comprises viewpoint information within a three-dimensional world that comprises a plurality of three-dimensional models;

determining the three-dimensional models that are to be displayed based on the received viewpoint information;

identifying the markup documents that are preassigned as texture to the three-dimensional models that are determined to be displayed;

rendering the identified markup documents;

storing the rendered markup documents in texture image files based on the received information;

rendering the three-dimensional models that are to be displayed; and mapping the markup documents stored in the texture image files to the rendered three-dimensional models.

2. The method of claim 1, wherein the input event is a selection of an address that identifies the location of the information.

3. The method of claim 1, wherein the received viewpoint information comprises information regarding a change in the viewpoint of a presently displayed image of the three-dimensional world.

4. The method of claim 3, wherein the input event is a selection of a new viewpoint within the three-dimensional world.

5. A computer-readable medium for performing the method of claim 1.

6. A computer-readable medium for performing the method of claim 2.

7. A computer-readable medium for performing the method of claim 3.

8. A computer-readable medium for performing the method of claim 4.

9. A system for generating images of three-dimensional models in a digital three-dimensional world, the three-dimensional models include markup documents preassigned as texture, said system comprising:

(a) a display device;

(b) a memory comprising texture image files; and (c) a processor coupled to the display device and the memory for receiving information based on an input event, wherein the information comprises viewpoint information within a three-dimensional world that comprises a plurality of three-dimensional models, said processor comprising:

(i) a three-dimensional processing component for determining the three-dimensional models that are to be displayed based on the received viewpoint information, rendering the three-dimensional models that are to be displayed; and mapping the markup documents to be stored in the texture image files to the rendered three-dimensional models; and (ii) a markup document processing component for identifying the markup documents that are preassigned as texture to the three-dimensional models that are determined to be displayed, rendering the identified markup documents, and storing the rendered markup documents in texture image files based on the received information.

10. The system of claim 9, wherein the input event is a selection of an address that identifies the location of the information that is received by the processor.

11. The system of claim 9, wherein the received viewpoint information comprises information regarding a change in the viewpoint of a presently displayed image of the three-dimensional world.

12. The system of claim 11, wherein the input event is a selection of a new viewpoint within the three-dimensional world.

* * * * *